United States Patent [19]
Kobayashi

[11] Patent Number: 5,230,538
[45] Date of Patent: Jul. 27, 1993

[54] PIPE COUPLING
[75] Inventor: Yoshikazu Kobayashi, Tokyo, Japan
[73] Assignee: Nitto Kohki Co., Ltd., Tokyo, Japan
[21] Appl. No.: 889,412
[22] Filed: May 28, 1992
[30] Foreign Application Priority Data
Jun. 11, 1991 [JP] Japan .................. 3-043569[U]
[51] Int. Cl.⁵ ............................................. F16L 37/18
[52] U.S. Cl. ..................... 285/316; 285/321; 285/906
[58] Field of Search .......... 285/315, 316, 86, 321, 285/906

[56] References Cited
U.S. PATENT DOCUMENTS

| | | | |
|---|---|---|---|
| 3,295,553 | 1/1967 | Garrett et al. | 285/315 X |
| 4,453,449 | 6/1984 | Hollmann | 285/316 X |
| 4,921,282 | 5/1990 | Meisinger | 285/315 X |

FOREIGN PATENT DOCUMENTS

| | | |
|---|---|---|
| 49-36017 | 4/1974 | Japan . |
| 51-5781 | 6/1976 | Japan . |
| 57-49030 | 7/1982 | Japan . |
| 6615131 | 4/1968 | Netherlands ............ 285/315 |
| 128377 | 1/1990 | Taiwan . |

Primary Examiner—Dave W. Arola
Attorney, Agent, or Firm—Nixon & Vanderhye

[57] ABSTRACT

A pipe coupler comprises a socket body having locking-ball receiving holes for receiving locking balls, a sleeve axially slidable on the socket body and a plug having an engaging groove for receiving the locking balls. The plug is detachably connected to the socket body due to operation of the sleeve. A step engageable with the rear side face of the engaging groove is formed on a portion of the socket body in a vicinity of the forward side of the locking-ball receiving holes. An axially movable and retractable ring is disposed in the engaging groove such that the ring is mounted on the portion of the socket body in front of the locking-ball receiving holes when the sleeve is free and retracts axially to engage the step so as to prevent the sleeve from advancing further when the ring coincides with the locking balls whereby the plug is locked to the socket body in a one-touch operation without flow loss. This structure ensures easy manufacture of a pipe coupler at a low cost.

5 Claims, 2 Drawing Sheets

PIPE COUPLING

BACKGROUND OF THE INVENTION

1. Field of the Invention

This invention relates to a pipe coupler in which a plug is selectively connected to or disconnected from a socket in a one-touch operation of the sleeve.

2. Description of the Prior Art

Japanese Examined Utility Model Application Publication No. 57-49030 published on Oct. 27, 1982 discloses a pipe coupler comprising a socket body provided with locking balls, a sleeve urged forward by a spring wound around the socket body and a plug formed with a locking-ball receiving groove. In coupling operation, the plug is connected to a socket constituted by the socket body and the sleeve, via the locking balls, by retracting the sleeve and inserting the plug into the socket. Uncoupling is accomplished also by retracting the sleeve and pulling the plug out of the socket. Coupling and uncoupling are carried out in so-called "a one-touch operation".

In this conventional one-touch operation type pipe coupler, a reciprocating ring urged forward by the spring is provided in the socket body. The ring is moved forward by the spring in a state in which the plug is not connected to the socket, and the outer peripheral surface of the ring receives the locking balls such that the inside portion of each locking ball is prevented from being pushed into the socket body and the outside portion of each locking ball projects outward from the socket body, thereby preventing the sleeve from advancing. On the other hand, as the plug is inserted into the socket, the forward end of the plug retracts the ring and the locking balls are allowed to enter the socket body. When the locking-ball receiving groove in the plug coincides with the locking balls, they are pushed by the sleeve in such a way that the inside portion of each locking ball engages the locking-ball receiving groove in the plug. In consequence, the sleeve advances under the urging force of the spring, and the locking-ball pressing face formed on the inner peripheral surface of the sleeve is pressed against the locking balls, thus preventing the locking balls from being disengaged from the locking-ball receiving groove.

Since the ring and the spring for urging the ring forward are provided in the socket member of a conventional one-touch type pipe coupler, the components of the pipe coupler must be made very thin in order to make the pipe coupler compact or very large in order to prevent flow loss. However, very thin components are poor in durability and cannot be manufactured easily. When, on the other hand, very large components are used, their manufacturing cost is high and they cannot be handled readily. In particular, in a pipe coupler of a small diameter, it is almost impossible to use either very thin components or very large components.

SUMMARY OF THE INVENTION

The object of this invention is to provide a pipe coupler which overcomes the above-mentioned problems occurring in the conventional pipe coupler.

In order to achieve the object, this invention provides a pipe coupler which comprises a socket including a socket body having a plug inserting end, an outer peripheral surface, a central hole and truncated conical locking-ball receiving holes arranged circumferentially around the outer peripheral surface and extending through the socket body from the outer peripheral surface to said the hole, the outer peripheral surface including a predetermined diameter surface portion ranging from the vicinity of the locking-ball receiving holes to the plug inserting end, a reduced diameter surface portion and a step formed between the predetermined diameter surface portion and the reduced surface portion, a sleeve mounted on the socket body and having an annular chamber in the form of an inner annular groove provided so as to coincide with the predetermined diameter surface portion of the socket body when the sleeve is in an extended position and to coincide with the locking-ball receiving holes in the socket body when the sleeve is moved in a retracting direction opposite to a direction toward the plug inserting end of the socket body, and an urging member for urging the sleeve toward the plug inserting end; a plurality of locking balls received by the locking-ball receiving holes; a plug having an outer peripheral surface formed with a locking-ball engaging groove which coincides with the locking-ball receiving holes when the plug is fully inserted into the central hole of the socket; and an elastic ring provided in the annular chamber so as to be mounted on the predetermined diameter surface portion of the socket body when the sleeve is free and to push the locking balls radially inward of the socket body when the sleeve is moved in the retracting direction.

As the sleeve is retracted against the urging force of the spring, the ring in the inner annular groove of the sleeve is moved in the same direction. When the ring is moved away from the predetermined diameter surface portion and arrives at the region of the locking receiving holes, the ring is radially retracted to push the locking balls radially inward of the socket body so as to be placed between the step and that side face of the inner annular groove (i.e., the rear side face) which is remoter than the other side face (i.e., the front end side) from the plug inserting end of the socket body. The ring acts as a stop for preventing the sleeve from advancing.

As the plug is inserted into the socket body, the locking balls, whose inside portions project in the central hole of the socket body, are pushed radially outward of the socket body by means of the plug at its outer peripheral surface. Thus the locking balls expand the ring radially outward of the socket body, and the outside portion of each locking ball enters the inner annular groove of the sleeve. The corresponding end of the expanded ring is disengaged from the step of the socket body and allows the sleeve to advance. As the sleeve advances, the rear side face of the inner annular groove engages those outside portions of the locking balls which project radially outward from the socket body and advancement of the sleeve is temporarily stopped.

When the plug is further inserted into the socket body and the locking-ball engaging groove arrives at the region of the locking balls, the locking balls are released from the radially outward pressing force applied by the outer surface portion of the plug and pressed radially inward of the socket body. The inside portion of each locking ball is projected in the central hole of the socket body and the locking balls engage the locking-ball engaging groove, whereby the sleeve is released from the locking balls and advances under the urging force of the spring. The rear side face of the inner annular groove of the sleeve abuts against the step of the socket body and the sleeve is held at this position. In this state, the ring rides on the predetermined diameter surface portion of the socket body. Since the locking balls are pushed radially inward of the socket body by the inner peripheral face of the sleeve in this state, the locking balls are prevented from being disengaged from the locking-ball engaging groove and the plug is firmly connected to the socket in a one-touch operation.

BRIEF DESCRIPTION OF THE DRAWINGS

This invention can be fully understood from the following description with reference to the accompanying drawings in which.

DETAILED DESCRIPTION OF THE PREFERRED EMBODIMENTS

Figure 1:
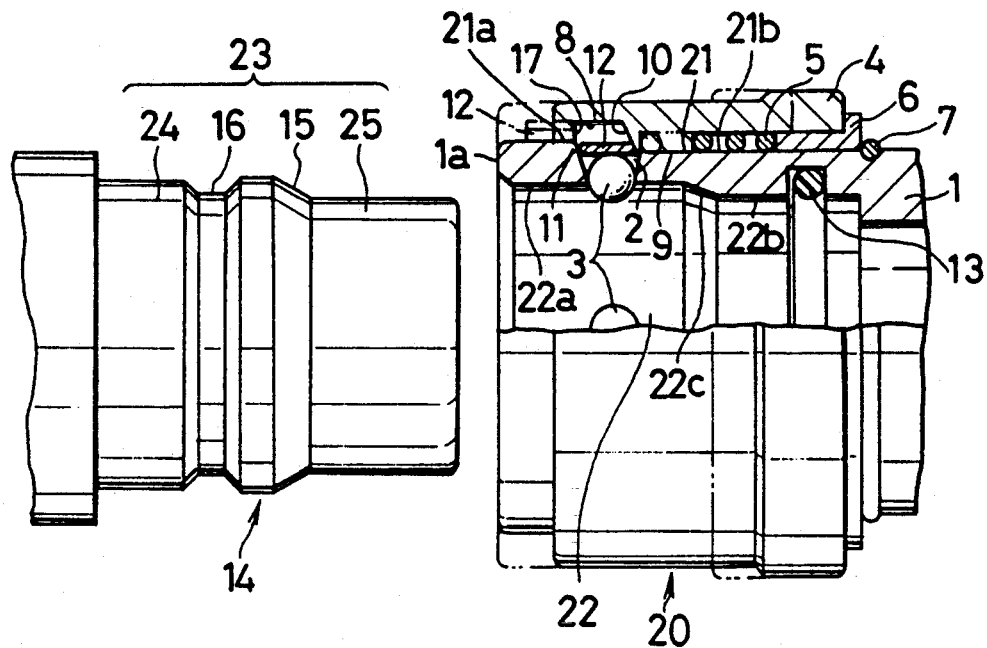
FIG. 1 is a longitudinal cross-sectional view of the upper half of the main portion of a socket and a side view of the upper half of the main portion of a plug, the socket and the plug constituting an embodiment of the pipe coupler according to this invention.
Figure 2:
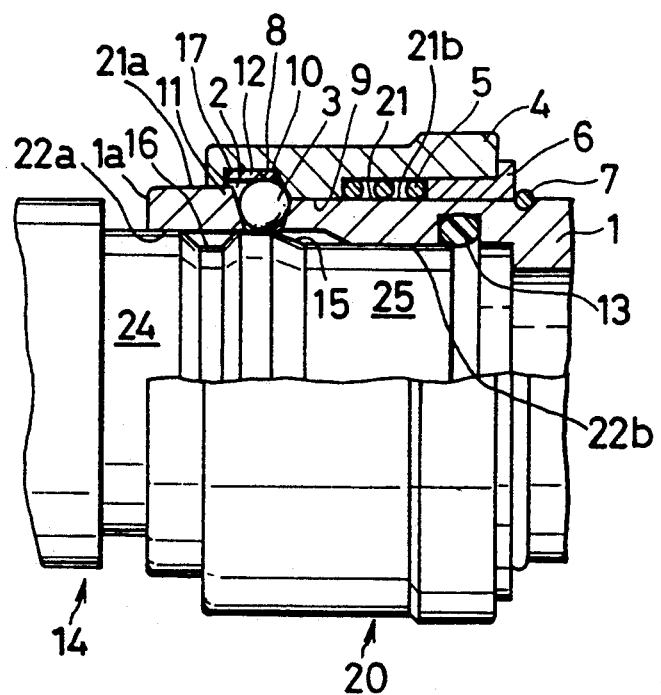
FIG. 2 is a cross-sectional view of the pipe coupler of this embodiment in the process in which the plug is being connected to the socket.
Figure 3:
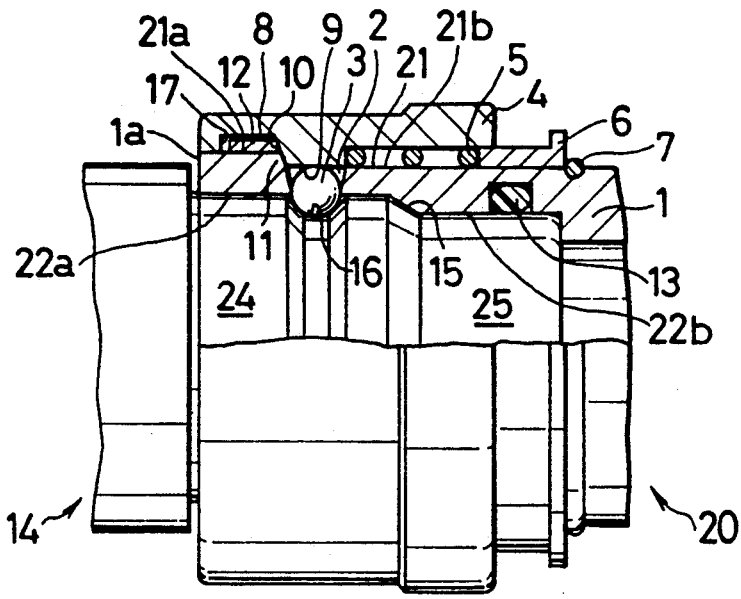
FIG. 3 is a cross-sectional view of the pipe coupler of this embodiment, in a state in which the plug is connected to the socket.

Referring to FIGS. 1 to 3, a socket 20 includes a socket body 1 which has a plug inserting end 1a, an outer peripheral surface 21 and a central hole 22. The central hole 22 has an increased diameter portion 22a and a reduced diameter portion 22b extending rearward from the increased diameter portion 22a. An inclined face 22c is formed between the increased diameter portion 22a and the reduced diameter portion 22b. A plurality of truncated conical locking-ball receiving holes 2 (hereinafter referred to as the "tapered holes 2") extend from the outer peripheral surface 21 to the increased diameter portion 22a of the central hole 22 through the portions of the socket body 1 which are close to the plug inserting end 1a and are arranged circumferentially around the socket body 1. In the tapered holes 2 are fitted locking balls 3 each having a diameter slightly smaller than the diameter of the tapered holes 2 at the outer peripheral surface of the socket body 1 and slightly larger than the diameter of the tapered holes 2 at the central hole 22 of the socket body 1. The outer peripheral surface 21 of the socket body 1 comprises a predetermined diameter surface portion 21a ranging from the vicinity of the tapered holes 2 to the plug inserting end 1a of the socket body 1, and reduced diameter surface portion 21b. An inclined step 11, which diverges toward the plug inserting end 1a, is defined between the predetermined diameter surface portion 21a and the reduced diameter surface portion 21b.

An axially slidable sleeve 4 is mounted on the socket body 1. A collar 6 is placed between the outer peripheral surface 21 of the socket body 1 and the inner peripheral face of the rear end of the sleeve 4. The inner peripheral edge of the rear end of the collar 6 engages a stop ring 7 fixedly mounted on the socket body 1 such that the collar 6 is held in a stationary position on the socket body 1, as shown in FIGS. 1 to 3. A compression coil spring 5 is wound around the socket body 1 and is anchored to the front end of the collar 6 at one end thereof and a step 18 formed on the inner peripheral face of the sleeve 4 at the other end thereof so as to urge the sleeve 4 forward (i.e., toward the plug inserting end 1a of the socket body 1).

The sleeve 4 is formed at its forward end with an annular chamber 8 in the form of an inner annular groove, for receiving the locking balls 3 and, also, formed on the intermediate portion of the sleeve 4 with a locking-ball retaining inner face 9. The annular chamber 8 (hereinafter referred to as the "inner annular groove 8") has a front side face 17 and a rear side face 10. The front side face 17 is perpendicular to the predetermined diameter surface portion 21a of the socket body 1, and the rear side face 10 is inclined so as to converge rearward and extends so as to be contiguous with the inner face 9. When the sleeve 4 is released, i.e., in an extended position, the inclined rear side face 10 abuts against the inclined step 11 so as not to allow the sleeve 4 to advance further than a position indicated by double-dot lines in FIG. 1 and by solid lines in FIG. 3. The inner annular groove 8 is formed so as to face the predetermined diameter surface portion 21a of the socket body 1 when the sleeve 4 is extended, and coincide with the region of the tapered holes 2 when the sleeve 4 is retracted fully. The locking-ball holding inner face 9 is adapted to face the locking-ball receiving holes 2 and push the locking balls 3 into the holes 2 while a plug 14, which will be described hereinafter, is being inserted into the central hole 22 of the socket body 1.

A radially expandable elastic ring 12, which retracts so as to have a reduced diameter in its free state, is disposed in the inner annular groove 8. More specifically, when the ring 12 is unstressed, its inner diameter is substantially equal to the diameter of the remaining surface portion 21b of the socket body 1. However, as shown by double-dot lines in FIG. 1, the sleeve 4 is free, i.e., unstressed, it is at the advanced position and the ring 12 is fitted on the predetermined diameter surface portion 21a of the socket body 1.

Figure 4:
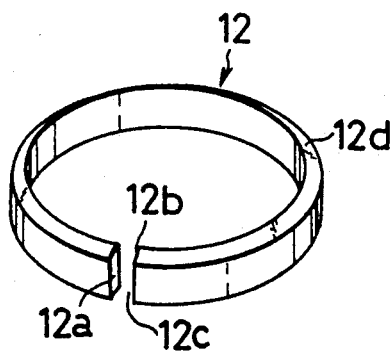
FIG. 4 is a perspective view of an embodiment of a ring according to this invention.

As shown in FIG. 4, an embodiment of the ring 1 is formed by a curved elastic elongated member with two facing ends 12a and 12b separated by a gap 12c provided therebetween when the ring 12 is unstressed. The ring 12 has a solid trapezoidal cross section such that its rear end face 12d inclines reciprocally to the rear side face 10 of the inner annular groove 8.

Figure 5:
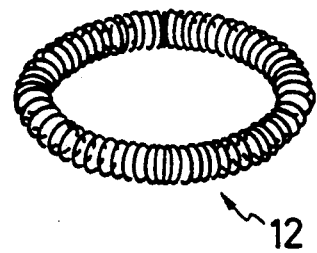
FIG. 5 is a perspective view of another embodiment of a ring according to this invention.

FIG. 5 shows another embodiment of the ring 12 which comprises a circular extension coil spring having a reduced diameter in an unstressed condition.

Figure 6:
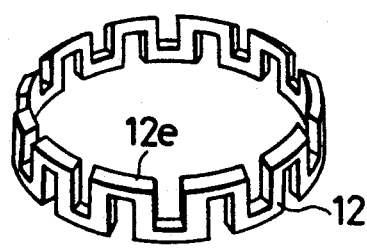
FIG. 6 is a perspective view of a further embodiment of a ring according to this invention.

In FIG. 6 is illustrated a further embodiment of the ring 12 which comprises an elastic elongated member forming successive rectangular waves. The rear end faces 12e of the ring 12 incline reciprocally to the rear side face 10 of the inner annular groove 8, as shown in the embodiment of FIG. 4.

Referring again to FIGS. 1 to 3, the plug 14, which is connectable to the socket 20, has an insertion section 23 to be inserted into the central hole 22 of the socket body 1. The insertion section 23 comprises (a) an increased diameter portion 24 forming the proximal side of the insertion section 23, (b) a reduced diameter portion 25 forming the distal side thereof, (c) an inclined face 15 formed between the both portions 24 and 25 and inclining reciprocally to the inclined face 22c of the socket body 1, and (d) a locking-ball engaging annular groove 16 formed in the increased diameter portion 24. The portions 24 and 25 have the same diameters as the increased diameter surface portion 21a and the remaining surface portion 21b of the socket body 1, respectively. The inclined face 15 contacts the locking balls 3 to move in the same radially outward direction of the socket body 1 while the plug 14 is being inserted into the central hole 2 of the socket body 1. The locking-ball engaging annular groove 16 is formed such that it aligns with the locking-ball receiving holes 2 when the plug 14 is fully inserted into the central hole 2. A seal 13 such as an O-ring is provided in the rear outer circumferential portion of the reduced diameter portion 22b of the socket body 1 and is pressed against the leading end section of the reduced diameter portion 25 of the plug 14 to effect sealing between the socket body 1 and the plug 14.

Operation of connection of the plug 14 to the socket 20 will now be described.

As the sleeve 4 is retracted against the urging force of the spring 5 prior to the connection of the plug 14 to the socket body 1, the ring 12 is pushed rearward by the front side face 17 of the inner annular groove 8 of the sleeve 4 and is moved rearward from the predetermined diameter surface portion 21a to the region of the tapered holes 2. When the sleeve 4 is retracted until the inner annular groove 8 coincides with the tapered holes 2, the ring 12 is disengaged from the predetermined diameter surface portion 21a of the socket body 1, and moved into a space defined between the step 11 and the rear side face 10 of the inner annular groove 8. Then the ring 12 contracts according to the elastic properties thereof in the range of the locking-ball receiving holes 2. The thus contracted ring 12 presses the locking balls 3 in the holes 2 radially inward in such a way that the inside of each locking ball 3 extends in the central hole 22 in the socket body 1. In this state, the forward end of the ring 12 abuts against the step 11 of the socket body 1, whereby the step 11 functions as a stop which maintains the sleeve 4 in a waiting state in which it is prevented from advancing, as shown in solid lines in FIG. 1.

Next, the plug 14 is inserted into the socket body 1. As the plug 14 is inserted, the locking balls 3, whose inside portions extend in the central hole 22, are pressed radially outward by the inclined face 15 of the plug 14, and the outside portions of the locking balls 3 expand the ring 12 and enter the inner annular groove 8. As the ring 2 is expanded, it is disengaged from the step 11 of the socket body 1 so as to allow the sleeve 4 to advance. The rear side face 10 of the inner annular groove 8 pushes the expanding ring 12 forward to cause the same to begin to engage the increased diameter surface portion 21a of the socket body 1. Referring to FIG. 2, when the locking balls 3 ride on the increased diameter portion 24 of the plug 14 and the step 11 abuts against the outside portions of the locking balls 3 which project outward from the locking-ball receiving holes 2, the sleeve 4 is temporarily prevented from advancing again, as shown in FIG. 2.

When the locking-ball engaging annular groove 16 in the plug 14 coincides with the locking-ball receiving holes 2 in the socket body 1 due to further insertion of the plug 14 into the socket body 1, the locking balls 3 are pushed radially inward by the locking-ball holding inner face 9 of the sleeve 4 so as to engage the locking-ball engaging groove 16. In this condition, the sleeve 4 is released again and advances. Finally, the rear side face 10 of the annular groove 8 in the sleeve 4 abuts against the inclined step 11 of the socket body 1, whereby the sleeve 4 returns to the initial free position and is finally stopped advancing, as shown in FIG. 3. Since the locking balls 3 are received in the locking-ball engaging annular groove 16 under the radial inward pressure applied by the locking-ball holding inner face 9 in this state, the plug 14 is locked to the socket 20 in a one-touch operation without flow loss and is prevented from being disengaged from the groove 16 after the plug 14 has been conducted to the socket 20.

The simple structure of this invention ensures easy manufacture of a pipe coupler at a low cost and is suited for a pipe coupler having a small diameter.

What is claimed is:

1. A pipe coupler comprising:
 a socket including a socket body having a plug inserting end, an outer peripheral surface, a central hole and truncated conical locking-ball receiving holes arranged circumferentially around said outer peripheral surface and extending through said socket body from said outer peripheral surface to said central hole, said outer peripheral surface including a predetermined diameter surface portion ranging from a vicinity of said locking-ball receiving holes to said plug inserting end, a remaining reduced diameter surface portion and a step along the outer surface of said socket body formed between said predetermined diameter surface portion and said reduced diameter surface portion, a sleeve mounted on said socket body and movable along said socket body between an extended position and a retracted position, said sleeve having a locking ball retaining inner face so as to coincide with said reduced diameter surface portion and an annular chamber in a form of an inner annular groove provided so as to coincide with said predetermined diameter surface portion of said socket body when said sleeve is in said extended position and to coincide with said locking-ball receiving holes in said socket body when said sleeve is moved toward said retracted position in a direction opposite to a direction toward said plug inserting end of said socket body, said annular chamber having two side faces arranged opposite to each other in an axial direction of said sleeve, one side face being spaced further from said plug inserting end of said socket body than the other side face and contacting said step when said sleeve is in said extended position and urging means for urging said sleeve toward said plug inserting end;
 a plurality of locking balls received by said locking-ball receiving holes;
 each of said locking-ball receiving holes being gradually widened toward said outer peripheral surface of said socket body and having a smaller inner diameter than each of said locking balls and a larger outer diameter than each of said locking balls;
 a plug having an outer peripheral surface formed with a locking-ball engaging groove which coincides with said locking-ball receiving holes when said plug is fully inserted into said central hole of said socket; and
 an elastic ring provided in said annular chamber and engaging said one side face of said sleeve, said elastic ring being biased for radial inward retraction movement and held between said one side face of said sleeve and said step by an urging force of said urging means, for urging said locking balls radially inwardly of said socket body when said sleeve is in said retracted position, said elastic ring being movable with said sleeve for radial expansion onto said predetermined diameter surface portion of said socket body when said sleeve is moved into said extended position for registration of said locking ball retaining inner face with said locking balls.

2. The pipe coupler according to claim 1, wherein said ring has a solid trapezoidal cross-section and two facing ends separated from each other.

3. The pipe coupler according to claim 1, wherein said ring comprises an extension coil spring.

4. The pipe coupler according to claim 1, wherein said ring comprises an elastic elongated member forming successive rectangular waves.

5. The pipe coupler according to claim 1, wherein said one side face inclines radially inwardly in said retracting direction, for engaging and smoothly guiding said ring radially outwardly of said socket body while said plug is being inserted into said central hole in said socket body.

* * * * *